(12) United States Patent
Wormsbaecher

(10) Patent No.: US 7,534,172 B2
(45) Date of Patent: May 19, 2009

(54) DIRECT TORQUE FLOW CONSTANT VELOCITY JOINT HAVING A NON-ROTATING BOOT

(75) Inventor: Hans Wormsbaecher, Lake Orion, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 43 days.

(21) Appl. No.: 11/318,235

(22) Filed: Dec. 23, 2005

(65) Prior Publication Data

US 2007/0149298 A1  Jun. 28, 2007

(51) Int. Cl.
*F16D 3/84* (2006.01)
(52) U.S. Cl. ........................... 464/175; 464/906
(58) Field of Classification Search ......... 464/173–175, 464/906
See application file for complete search history.

(56) References Cited

U.S. PATENT DOCUMENTS 3,255,839 A * 6/1966 Goldman ................. 464/175 X
3,362,193 A    1/1968 Ritsema
3,986,754 A * 10/1976 Torrant
4,094,376 A    6/1978 Welschof
4,282,722 A    8/1981 Orain
4,491,238 A * 1/1985 Tobolt
5,695,202 A * 12/1997 Cartwright et al.
6,328,653 B1 * 12/2001 Aurora .................. 464/175 X
2003/0144061 A1  7/2003 Krude
2005/0192106 A1  9/2005 Cermak

FOREIGN PATENT DOCUMENTS

EP    0677686 A1  10/1995

* cited by examiner

*Primary Examiner*—Greg Binda
(74) *Attorney, Agent, or Firm*—Jennifer M. Brumbaugh; Mick A. Nylander

(57) ABSTRACT

A direct torque flow constant velocity joint connector includes an outer joint part having outer ball tracks and an outer surface, an inner joint part with inner ball tracks, a cage, a plurality of balls held in the cage and engaging the inner and outer ball tracks, and a boot. The boot includes a first end and a second end, wherein the first end is axially secured to the outer surface of the outer joint part while providing rotational freedom between the boot and the outer joint part, and the second end is selectively attachable to a supplied drive unit.

18 Claims, 2 Drawing Sheets

DIRECT TORQUE FLOW CONSTANT VELOCITY JOINT HAVING A NON-ROTATING BOOT

TECHNICAL FIELD

The present invention relates generally to motor vehicle shaft joints, and more particularly concerns a direct torque flow constant velocity joint having a non-rotating boot.

BACKGROUND

Constant velocity joints connecting shafts to drive units are common components in automotive vehicles. The drive unit typically has an output shaft or an input shaft for receiving the joint. Typically, the drive unit is an axle, transfer case, transmission, power take-off unit or other torque device, all of which are common components in automotive vehicles. Typically, one or more joints are assembled to the shaft to form a propeller or drive shaft assembly. It is the propeller shaft assembly, which is connected, for instance, at one end to an output shaft of a transmission and, at the other end, to an input shaft of a differential. The shaft is solid or tubular with ends adapted to attach the shaft to an inner race of the joint thereby allowing an outer race connection to a drive unit. The inner race of the joint is typically press-fit, splined, or pinned to the shaft making the outer race of the joint available to be bolted or press-fit to a hub connector, flange or stubshaft of the particular drive unit. At the other end of the propeller shaft, the same typical or traditional connection is made to a second drive unit when connecting the shaft between the two drive units. Connecting the shaft to a drive unit via the constant velocity joint in this manner is considered a traditional connection. Direct torque flow (DTF) connection is a newer connection style that has advantages and improvements over the traditional connection.

A DTF connection differs from a traditional connection in that an outer race is connected to the shaft that extends between different joints, and an inner race is connectable to a drive unit. One example of a DTF connection provides that the outer race of a constant velocity joint (CVJ) is friction welded to a propeller shaft and the inner race of the CVJ includes a female spline that is connectable to a journal shaft of a transmission. The inner race of the CVJ is rotationally secured by a splined connection directly to the journal shaft, thereby providing an indirect connection to the transmission. In order to retain the CVJ on the shaft, axial retention is required between the inner race and the shaft. For example, a circlip engaging a groove in the inner race and on the shaft may be utilized to retain the two parts. In order to retain lubricant within the joint and thereby sealing out debris, a roll or convoluted boot is connected between the inner race and the outer race. The boot may or may not include a boot shroud. However, axial and radial clearances of the joint at the connection interface for accommodating the boot or shroud may require a decrease in torque transfer capability or may require an increase in the joint design envelope. A decrease in torque transfer capability reduces the overall joint performance and an increase in the design envelope may extenuate unwanted noise and vibration excitations. Moreover, a boot connected between the inner race and the outer race makes inspection of the races more difficult.

It would be advantageous to have a DTF constant velocity joint that overcomes the limitations indicated above. Moreover, it would be advantageous to have a DTF constant velocity joint that provides for a connection to a drive unit while reducing radial and axial clearances, including a reduction in overall design envelope. Furthermore, it would be advantageous to provide a DTF CVJ that improves inspection capability of the connection interface.

SUMMARY OF THE INVENTION

Accordingly, the present invention provides a direct torque flow constant velocity joint (DTF CVJ) connector having a non-rotating boot. The DTF CVJ connector, with a non-rotating boot, may advantageously connect to a drive unit, such as a transmission, transfer case or axle, thereby reducing radial and axial clearance. The inventive DTF CVJ connector allows for additional flexibility by providing for improved inspection at the connection interface.

A direct torque flow constant velocity joint connector is provided that includes a first shaft, an outer joint part connected to the first shaft, a plurality of balls, an inner joint part and a boot. The outer joint part includes an outer surface, a bore and a plurality of ball tracks located in the bore. The inner joint part includes an outer surface and a plurality of ball tracks located on the outer surface. The inner joint part is articulately secured in a rotationally fast way to the outer joint part with the plurality of balls. The boot includes a first end and a second end, wherein the first end is axially secured to the outer surface of the outer joint part while providing rotational freedom between the boot and the outer joint part. The second end is selectively attachable to a supplied drive unit when the inner joint part is selectively attached to the supplied drive unit.

The present invention will be understood by reference to the following detailed description and taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION

In the following description, various operating parameters and components are described for one or more constructed embodiments. These specific parameters and components are included as examples and are not meant to be limiting.

While the invention is described with respect to a direct torque flow constant velocity joint (DTF CVJ) having a non-rotating boot for use in a vehicle, the following apparatus is capable of being adapted for various purposes including automotive vehicle drive axles, motor systems that use a propeller shaft, or other vehicles and non-vehicle applications which require propeller shaft assemblies for torque transmission.

Figure 1:
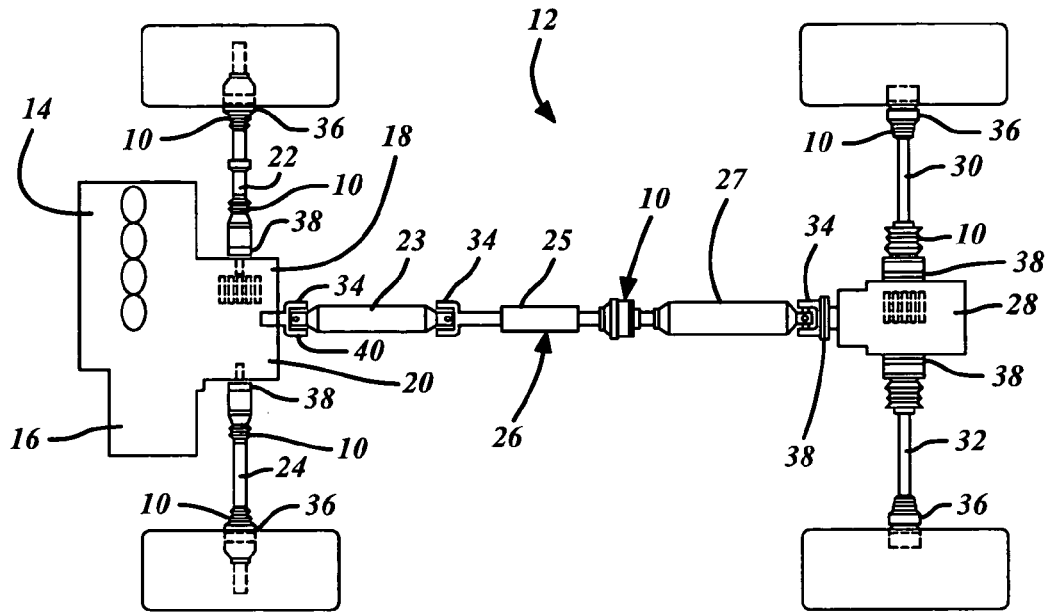
FIG. 1 shows a plan view of an exemplary drive system for a typical four-wheel drive automobile wherein the present invention may be used to advantage.

An exemplary drive system 12 for a typical four-wheel drive automobile is shown in FIG. 1. While a four-wheel drive system is shown and described, the concepts here presented could apply to a single drive unit system or multiple drive unit system, including rear wheel drive only vehicles, front wheel drive only vehicles, all wheel drive vehicles, and four wheel drive vehicles. In this example, the drive system 12 includes an engine 14 that is connected to a transmission 16 and a power take-off unit 18. A front differential 20 has a right hand side half shaft 22 and left hand side half shaft 24, each of which are connected to a wheel and deliver power to the wheels. On both ends of the right hand side half shaft 22 and left hand side half shaft 24 are constant velocity joints 10. A propeller shaft 26 connects the front differential 20 to a rear differential 28 wherein the rear differential 28 includes a rear right hand side shaft 30 and a rear left hand side shaft 32, each of which include a wheel on one end thereof. Constant velocity joints 10 are located on both ends of the half shafts 30, 32 that connect to the wheels and the rear differential 28. The propeller shaft 26, shown in FIG. 1, is a three-piece propeller shaft that includes a plurality of Cardan joints 34 and one high-speed constant velocity joint 10. The propeller shaft 26 includes interconnecting shafts 23, 25, 27. The constant velocity joints 10 transmit power to the wheels through the propeller shaft 26 even if the wheels or the propeller shaft 26 have changed angles due to steering, raising, or lowering of the suspension of the vehicle. The constant velocity joints 10 may be any of the standard types known, such as a plunging tripod, a cross groove joint, a fixed ball joint, a fixed tripod joint, or a double offset joint, all of which are commonly known terms in the art for different varieties of constant velocity joints 10. The constant velocity joints 10 allow for transmission of constant velocities at angles typically encountered in everyday driving of automotive vehicles in both the half shafts, interconnecting shafts and propeller shafts of these vehicles. Optionally, each Cardan joint 34 may be replaced with any other suitable type of joint, including constant velocity joint types. The direct torque flow constant velocity joint with a collet connector may be utilized to advantage for any of the above mentioned joint locations.

The shafts 22, 23, 24, 25, 27, 30, 32 may be solid or tubular with ends adapted to attach each shaft to an inner race or an outer race of a joint in accordance with a traditional connection, thereby allowing the outer race or inner race to be connected to a hub connector 36, a flange 38 or stubshaft 40 of each drive unit, as appropriate, for the particular application. Thus, any of the traditional connections identified in FIG. 1 at 10 or 34 that connect to a drive unit may be a DTF CVJ having a non-rotating boot in accordance with a first embodiment (FIG. 2) or a second embodiment (FIG. 3) of the present invention.

Figure 2:
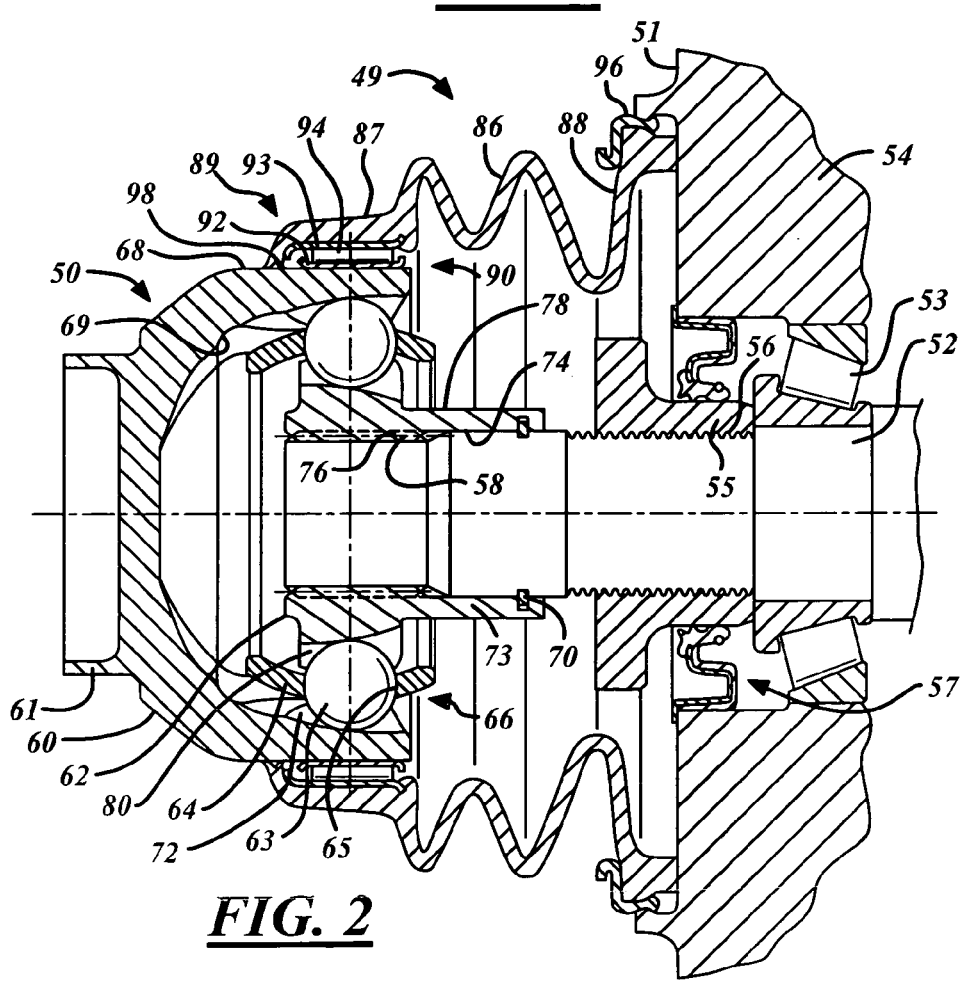
FIG. 2 shows a first embodiment of an inventive direct torque flow constant velocity joint being used to advantage.
Figure 3:
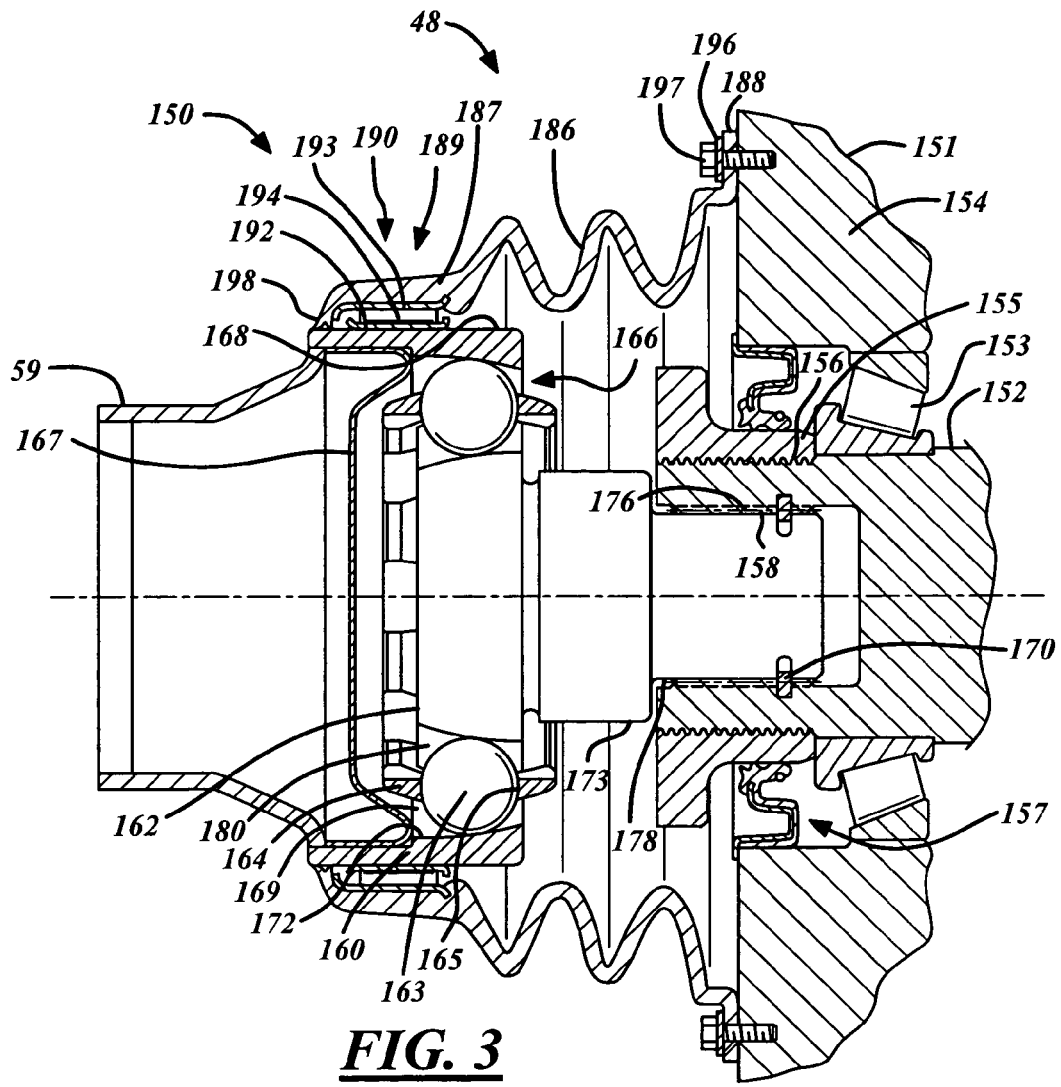
FIG. 3 shows a second embodiment of an inventive direct torque flow constant velocity joint being used to advantage.

For completeness of the description of the first and second embodiments of the present invention as given in FIGS. 2 and 3, the term direct torque flow (DTF) connection refers to a connection from the inner race of a constant velocity joint (CVJ) to the shaft of a differential, transmission or transfer case, generally supplied by the customer. The connection typically is in the form of a spline because of its robust design features as understood by one skilled in the art. However, it is anticipated that other forms of connection are appropriate including fixed and releasable connections between the inner race and the shaft. A mating key connection is just one example, without limitation, of a releasable connector between the inner race and the shaft. Thus, a DTF connection refers to the inner race coupling to the shaft of a drive unit, such as a differential, transmission or transfer case without limitation, as opposed to the traditional connection mentioned above. The connection type may be divided into two styles of DTF connection types, i.e. direct or indirect, as described in U.S. Patent Application Publication No.: 2007/0123357, incorporated by reference herein. The DTF direct connection utilizes an extension shaft on the inner joint part to provide a male connection to a drive unit, such as shown in FIG. 3. The DTF indirect connection utilizes a female coupling on the inner joint part to provide a female connection to a shaft of a drive unit, such as shown in FIG. 2.

Also, as used herein, a DTF connector refers to a joint coupled to a shaft which forms a DTF shaft assembly. Only together with the shaft of a differential, for example, does a DTF connector combine to make a DTF connection. It is recognized that the shaft of the drive unit may include the shaft of any input or output drive unit and is not necessarily limited to a shaft of a differential, transmission or transfer case.

FIG. 2 shows a first embodiment of an inventive direct torque flow constant velocity joint 50 being used to advantage. The inventive DTF CVJ connector 50 is shown assembled to a shaft journal 52 of a transmission 51 thereby forming an indirect DTF connection 49. The shaft journal 52 is supported by a bearing 53 in a housing 54, which, in this case, is illustrated in the form of a housing in the transmission drive unit of a motor vehicle. The bearing 53 is axially tensioned by a tensioning nut 55, which has been threaded on to a threaded portion 56 of the shaft journal 52. A shaft seal 57 optionally seals the tensioning nut 55 relative to the transmission housing 54. Moreover, the shaft seal 57 serves to ensure that transmission oil does not leak into the chamber created by the DTF CVJ 50. Also, the shaft seal 57 reduces the amount of joint lubrication being expelled into the transmission 51. The shaft journal 52 includes toothed or splined shaft portion 58 for receiving the DTF CVJ connector 50. Generally, the DTF CVJ connector 50 comprises an outer joint part 60 connected or welded to the propeller shaft (shown by item 59 in FIG. 3) by way of a collar 61 of the outer joint part 60, an inner joint part 62, torque transmitting balls 63 and a ball cage 64. The term direct torque flow (DTF) connection refers to a connection from the inner race of a constant velocity joint (CVJ) to the shaft of a differential, transmission or transfer case, generally supplied by the customer. A DTF indirect connection is indirect because connection with the inner race of a CVJ is female. The DTF direct connection includes a shaft section axially extending from the inner race of a CVJ that is usable to advantage for connecting to a supplied drive unit. The DTF indirect connection typically is in the form of a spline because of its robust design features as understood by one skilled in the art. Also, the DTF CVJ connector 50 includes a boot 86, to be described below.

The outer joint part 60 generally has a circumferential-shaped or semi-spherical bore 66 therein and an outer surface 68. The outer joint part 60 is generally made of a steel material, however, it should be noted that any other type of metal material, hard ceramic, plastic, or composite material, etc. may also be used for the outer joint part 60. The material is required to be able to withstand the high speeds, temperatures and contact pressures required for the DTF CVJ connector 50. The outer joint part 60 also includes a plurality of axially opposed ball tracks 72 located on an inner surface 69 thereof. The tracks 72 generally form a spherical shaped path within the inner surface 69 of the outer joint part 60. The tracks 72 are axially opposed such that one half of the ball tracks 72 open to a side of the outer joint part 60 opposite to that of the other half of the ball tracks 72 in any number of patterns. Optionally, for different types of CVJs, the ball tracks all may open or axially align on the same side of the outer race. Also, the ball tracks 72 may be of a gothic arch or elliptical shape provided the pressure angle and conformity are maintained, or may be other shapes, as is understood by a person having skill in the art. Moreover, the ball tracks 72 on the inner surface 69 of the outer joint part 60 may also be double offset tracks. It should be noted that in the embodiment shown in the drawings is a four plus four constant velocity joint, which has a total of eight balls in the DTF CVJ connector 50. Further, it is recognized the DTF CVJ connector may be a fixed or plunging CVJ, including without limitation a VL, RF, AC, DO, or tripod joints including other fixed or plunging CVJs. However, it should be noted that it is also contemplated that a joint may be made having any number of balls incorporating all of the features of the DTF CVJ connector 50 according to the present invention.

The inner joint part 62 of the present embodiment generally has a circumferential shape. The inner joint part 62 is arranged within a bore 66 of an outer joint part 60. The inner joint parts 62 includes an extension 73 and an inner bore 74 that has a plurality of spline 76 for axially retaining the DTF CVJ in a rotationally fast way to a toothed or splined shaft portion 58 of a shaft 52. Rotational retention of the inner joint part 62 with a shaft 52 may be accomplished in other ways as would be recognized by a person of skill in the art. Axial retention of the inner joint part 62 with a shaft 58 is by way of a circlip 70. It is also recognized that axial retention of the inner joint part 62 with a shaft 58 may also be accomplished by a collet connector, a spring clip, or a threaded fastener just to name a few examples, without limitation. The outer surface 78 of the inner joint part 62 includes a plurality of ball tracks 80 that are axially opposed. The ball tracks 80 generally have a spherical shape and are aligned with the ball tracks 72 on the outer joint part 60 such that the axial angle will open in a similar or the same direction as the ball track 72 directly aligned above it on the outer joint part 60. The ball tracks 80 on the outer spherical surface of the inner joint part 62 have one half of the ball tracks 80 axially oriented in one way while the other half of the ball tracks 80 are axially oriented in the opposite direction. The ball tracks 80 will open in an alternating pattern around the outer circumference of the inner joint part 62 in a matching relationship to that of the ball tracks 72 of the outer joint part 60. It should be noted that in this embodiment the inner joint part 62 is made of steel, however, any other metal composite, hard plastic, ceramic, etc. may also be used.

The ball cage 64 generally has a ringlike appearance. The ball cage 64 is arranged within the bore 66 of the outer joint part 60 such that it is not, in this embodiment, in contact with the inner surface of the outer joint part 60. The cage 64 has a plurality of oblong-shaped orifices or windows 65 through a surface thereof. The number of windows 65 may match the number of ball tracks 72, 80 on the outer joint part 60 and inner joint part 62 of the different DTF CVJ connector 50, which is eight windows 65 therethrough in the present embodiment of the invention. The number of balls and windows may, however, differ. The cage 64 along with the inner joint part 62 are preferably made of a steel material but any other hard metal material, plastic, composite or ceramic, etc. may also be used.

The constant velocity joint 50 includes a plurality of balls 63. The balls 63 are each arranged within one each of the windows 65 of the cage 64 and within a ball tracks 72, 80 of the outer joint part 60 and of the inner joint part 62, respectively. However, it is recognized that more than one ball may be arranged within each of the windows 65 or there may be no balls within a window 65. Therefore, the balls 63 will be capable of rolling in the axially opposed tracks 72, 80 aligned in the same direction.

The DTF CVJ connector 50 may include a grease cap or barrier (shown as 167 in FIG. 3) on one end. The barrier is generally made of a metal material, however any plastic, rubber, ceramic or composite material may also be used. The barrier is press-fit or integrally constructed between the outer joint part 60 and the propeller shaft (shown as 59 in FIG. 3). However, any other securing method known may also be used such as fasteners, bonding, etc. The barrier will insure the grease, which is used as a lubricant, will remain within the DTF CVJ connector 50. Optionally, a vent port (not shown) may be placed through the barrier 167 or the outer joint part 60 to relieve any internal pressure within the DTF CVJ connector 50, and the vent port may include a valve (not shown).

The DTF CVJ connector 50 includes a non-rotating boot 86 for providing a protective barrier for the internal parts. A first end 87 of the boot 86 is secured on the outer surface 68 of an outer joint part 60. Optionally, but not shown, the outer joint part may include a circumferential channel or recess for receiving the first end 87 of the boot 86. In accordance with one aspect of the invention, boot 86 is secured to outer joint part 60 by a roller bearing 90 such that the outer joint part 60 may rotate with respect to boot 86. In this embodiment, boot 86 is a non-rotating boot that serves to seal grease or other suitable lubricant within the indirect DTF connection 49 completed by the DTF CVJ connector 50 coupled to a transmission 51. Any known securing method can be used to secure the first end 87 of the boot 86 to the outer joint part 60 such as a clamp, fastener, or interference fit, for example, without limitation. However, in this embodiment the first end 87 of the boot 86 is secured to the outer joint part 60 by a frictional fit between the connecting parts. The boot 86 is generally convoluted and extends between the first end 87 and a second end 88 having two or more convolutes, such that the boot 86 may flex as the connector 50 is rotationally articulated. While this boot has two convolutes, it is recognized that any number of convolute or even another boot type may be utilized to advantage. The second end 88 of the boot 86 is releasably securable to a transmission housing 54 by a mounting ring or securing member 96, thereby providing a sealed environment for the shaft journal 52. Optionally, as recognized by a person of skill, the boot 86 may include the mounting ring or securing member 96 molded into its second end 88. Moreover, while the snap ring 96 is releasably retained against the transmission housing 54, it also compressively retains the second end 88 of the boot 86 against the transmission housing 54. It is also recognized, that the second end 88 of the boot 86 may be fixed via any known fastener to the transmission housing 54. Boot 86 also serves to keep contaminates from the outside environment from penetrating an inner chamber of the indirect DTF connection 49. The boot 86 is generally made of a urethane material, but any other pliable material such as fabric, plastic, composites, thermoplastic elastomers (TPE), or rubber may be employed for constructing the boot 86. Indeed, any material may be used so long as the material for the boot 86 is capable of withstanding high temperatures and high speed while staying pliable to accommodate any changes in angles experienced by DTF CVJ connector 50 due to driving conditions.

The boot 86 is non-rotating with respect to DTF CVJ connector 50 from the vantage point of the transmission housing 54. While a roller bearing 90 is presented, other bearing types such as a needle bearing or a ball bearing may be utilized to allow the boot 86 to stay relatively stationary with respect to the rotating joint. Also, the roller bearing 90 may be a sealed unit having at least one seal (not shown), an inner bearing race 92, an outer bearing race 93 and a plurality of bearings 94 between the races, such that the roller bearing 90 may positioned between a mounting lip 89 of the boot 86 and an outside surface 68 of the outer joint part 60. Moreover, the roller bearing 90 may be sealed or molded into the mounting lip 89 of the first end 87 of the boot 86. Again, the bearing 90 permits the DTF CVJ 50 to rotate with respect to the boot 86, while keeping the boot 86 fixed with respect to a transmission housing 54.

The boot 86 may also include a lip seal 98. The lip seal 98 provides additional sealing between the boot 86 and the outer surface 68 of the outer joint part 60, thereby providing an additional barrier to the indirect DTF connection 49 and the bearing 90 from unwanted debris.

FIG. 3 shows a second embodiment of an inventive direct torque flow constant velocity joint 150 being used to advantage. The inventive DTF CVJ connector 150 is shown assembled to a shaft journal 152 of a transmission 151 thereby forming a direct DTF connection 48. The shaft journal 152 is supported by a bearing 153 in a housing 154, which, in this case, is illustrated in the form of a housing in the transmission drive unit of a motor vehicle. The bearing 153 is axially tensioned by a tensioning nut 155, which has been threaded on to a threaded portion 156 of the shaft journal 152. A shaft seal 157 optionally seals the tensioning nut 155 relative to the transmission housing 154. Moreover, the shaft seal 157 serves to ensure that transmission oil does not leak into the chamber created by the direct DTF connection 48. Also, the shaft seal 157 reduces the amount of joint lubrication being expelled into the transmission 151. The shaft journal 152 includes toothed or splined shaft portion 158 for receiving the DTF CVJ connector 150. Generally, the DTF CVJ connector 150 comprises an outer joint part 160 connected or welded to the propeller shaft 59, an inner joint part 162, torque transmitting balls 163 and a ball cage 164. Also, the DTF CVJ connector 150 includes a boot 186, to be described below.

The outer joint part 160 generally has a circumferential-shaped or semi-spherical bore 166 therein and an outer surface 168. The outer joint part 160 is generally made of a steel material, however, it should be noted that any other type of metal material, hard ceramic, plastic, or composite material, etc. may also be used for the outer joint part 160. The material is required to be able to withstand the high speeds, temperatures and contact pressures required for the DTF CVJ connector 150. The outer joint part 160 also includes a plurality of axially opposed ball tracks 172 located on an inner surface 169 thereof. The tracks 172 generally form a spherical shaped path within the inner surface 169 of the outer joint part 160. The tracks 172 are axially opposed such that one half of the ball tracks 172 open to a side of the outer joint part 160 opposite to that of the other half of the ball tracks 172 in any number of patterns. Optionally, for different types of CVJs, the ball tracks all may open or axially align on the same side of the outer race. Also, the ball tracks 172 may be of a gothic arch or elliptical shape provided the pressure angle and conformity are maintained, or may be other shapes, as is understood by a person having skill in the art. Moreover, the ball tracks 172 on the inner surface 169 of the outer joint part 160 may also be double offset tracks. It should be noted that in the embodiment shown in the drawings is a four plus four constant velocity joint, which has a total of eight balls in the DTF CVJ connector 150. Further, it is recognized the DTF CVJ connector may be a fixed or plunging CVJ, including without limitation a VL, RF, AC, DO, or tripod joints including other fixed or plunging CVJs. However, it should be noted that it is also contemplated that a joint may be made having any number of balls incorporating all of the features of the DTF CVJ connector 150 according to the present invention.

The inner joint part 162 of the present embodiment generally has a circumferential shape. The inner joint part 162 is arranged within the bore 166 of the outer joint part 160. The inner joint part 162 includes an axial extension 173 extending therefrom, and a plurality of spline 176 for axially retaining the DTF CVJ 150 in a rotationally fast way to a toothed or splined shaft portion 158 of a shaft 152. Rotational retention of the inner joint part 162 with a shaft 152 may be accomplished in other ways as would be recognized by a person of skill in the art. Axial retention of the inner joint part 162 with a shaft 158 is by way of a circlip 170. Also recognized, axial retention of the inner joint part 162 with a shaft 158 may also be accomplished by a spring clip or a threaded fastener just to name a few examples, without limitation. The outer surface 178 of the inner joint part 162 includes a plurality of ball tracks 180 that are axially opposed. The ball tracks 180 generally have a spherical shape and are aligned with the ball tracks 172 on the outer joint part 160 such that the axial angle will open in a similar or the same direction as the ball track 72 directly aligned above it on the outer joint part 160. The ball tracks 180 on the outer spherical surface of the inner joint part 162 have one half of the ball tracks 180 axially oriented in one way while the other half of the ball tracks 180 are axially oriented in the opposite direction. The ball tracks 180 will open in an alternating pattern around the outer circumference of the inner joint part 162 in a matching relationship to that of the ball tracks 172 of the outer joint part 160. It should be noted that in this embodiment the inner joint part 162 is made of steel, however, any other metal composite, hard plastic, ceramic, etc. may also be used.

The ball cage 164 generally has a ringlike appearance. The ball cage 164 is arranged within the bore 166 of the outer joint part 160 such that it is not, in this embodiment, in contact with the inner surface of the outer joint part 160. The cage 164 has a plurality of oblong-shaped orifices or windows 165 through a surface thereof. The number of windows 165 may match the number of ball tracks 172, 180 on the outer joint part 160 and inner joint part 162 of the different DTF CVJ connector 150, which is eight windows 165 therethrough in the present embodiment of the invention. The number of balls and windows may, however, differ. The cage 164 along with the inner joint part 162 are preferably made of a steel material but any other hard metal material, plastic, composite or ceramic, etc. may also be used.

The constant velocity joint 150 includes a plurality of balls 163. The balls 163 are each arranged within one each of the windows 165 of the cage 164 and within a ball track 172, 180 of the outer joint part 160 and of the inner joint part 162, respectively. However, it is recognized that more than one ball may be arranged within each of the windows 165 or there may be no balls within a window 165. Therefore, the balls 163 will be capable of rolling in the axially opposed tracks 172, 180 aligned in the same direction.

The DTF CVJ connector 150 may include a grease cap or barrier 167 on one end. The barrier is generally made of a metal material, however any plastic, rubber, ceramic or composite material may also be used. The barrier is press fit or integrally constructed between the outer joint part 160 and the propeller shaft 59. However, any other securing method known may also be used such as fasteners, bonding, etc. The barrier will insure the grease, which is used as a lubricant, will remain within the DTF CVJ connector 150. Optionally, a vent port (not shown) may be placed through the barrier 167 or the outer joint part 160 to relieve any internal pressure within the DTF CVJ connector 150, and the vent port may include a valve (not shown).

The DTF CVJ connector 150 includes a non-rotating boot 186 for providing a protective barrier for the internal parts. A first end 187 of the boot 186 is secured on the outer surface 168 of an outer joint part 160. Optionally, but not shown, the outer joint part may include a circumferential channel or stepped recess for receiving the first end 187 of the boot 186 thereon. In accordance with one aspect of the invention, boot 186 is secured to outer joint part 160 by a needle bearing 190 such that the outer joint part 160 may rotate with respect to boot 186. In this embodiment, boot 186 is a non-rotating boot that serves to seal grease or other suitable lubricant within the direct DTF connection 48 completed by the DTF CVJ connector 150 coupled to a transmission 151. Any known securing method can be used to secure the first end 187 of the boot 186 to the outer joint part 160 such as a clamp, fastener, or interference fit, for example, without limitation. However, in this embodiment the first end 187 of the boot 186 is secured to the outer joint part 160 by a frictional fit between the connecting parts. The boot 186 is generally convoluted and extends between the first end 187 and a second end 188 having two convolutes, such that the boot 186 may flex as the connector 150 is rotationally articulated. While this boot has two convolutes, it is recognized that any number of convolute or even another boot type may be utilized to advantage. The second end 188 of the boot 186 is releasably securable to a transmission housing 154 by a mounting flange or securing member 196 retained by a plurality of bolt 197, around a shaft journal 152. Optionally, as recognized by a person of skill, the boot 186 may include the securing member 196 molded into its second end 188. Moreover, while the securing member 196 is releasably retained against the transmission housing 154, it also compressively retains the second end 188 of the boot 186 against the transmission housing 154. It is also recognized, that the second end 188 of the boot 186 may be fixed via any known fastener to the transmission housing 154. Boot 186 also serves to keep contaminates from the outside environment from penetrating an inner chamber of the direct DTF connection 48. The boot 186 is generally made of a urethane material, but any other pliable material such as fabric, plastic, composites, TPE, or rubber may be employed for constructing the boot 186. Indeed, any material may be used so long as the material for the boot 186 is capable of withstanding high temperatures and high speed while staying pliable to accommodate any changes in angles experienced by DTF CVJ connector 150 due to driving conditions.

The boot 186 is non-rotating with respect to DTF CVJ connector 150 from the vantage point of the transmission housing 154. While a needle bearing 190 is presented, other bearing types such as a roller bearing or a ball bearing may be utilized to allow the boot 186 to stay relatively stationary with respect to the rotating joint. Also, the bearing 190 may be a sealed unit having at least one seal (not shown), an inner bearing race 192, an outer bearing race 193 and a plurality of bearings 194 between the races, such that the roller bearing 190 may positioned between a mounting surface 189 of the boot 186 and an outside surface 168 of the outer joint part 160. Moreover, the bearing 190 may be sealed or molded into the mounting surface 189 of the first end 187 of the boot 186. Again, the bearing 190 permits the DTF CVJ 150 to rotate with respect to the boot 186, while keeping the boot 186 fixed with respect to a transmission housing 154.

The boot 186 may also include a boot seal 198. The boot seal 198 provides additional sealing of the boot 186 while rotating about the outer surface 168 of the outer joint part 160, thereby providing an additional barrier to the direct DTF connection 48 and the bearing 190 from unwanted debris.

While the first end 187 of the boot 186 is shown coupled to and rotationally free about the axis of the outer joint part 160, it is recognized that the boot 186 may also be coupled to and be rotationally free about the shaft 152 of the transmission 151 with an additional bearing set.

While the material, coupling and treatment of the various other DTF parts have not been discussed, appropriate selection would be well understood by a person of skill in the art.

While the above embodiments of the invention are described for a particular CVJ having balls and sets of ball tracks for a particular type of constant velocity joint motion, it is recognized that any other suitable constant velocity balls and sets of ball tracks may be utilized with the current invention to advantage. Moreover, the CVJ may also be of the fixed or plunging type of joint as is recognized within the art.

From the foregoing, it can be seen that there has been brought to the art a new and improved direct torque flow constant velocity joint having a non-rotating boot. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A direct torque flow constant velocity joint connector comprising:
    an outer joint part having an inner and outer surface and outer ball tracks located on said inner surface;
    an inner joint part having inner ball tracks and being configured to be directly connected to a drive unit to form a DTF connection, wherein said drive unit is one of a differential, transmission and transfer case;
    a cage;
    a plurality of balls provided in the cage and engaging the inner and outer ball tracks; and
    a non-rotating boot having a first end and a second end, wherein said first end is axially secured to said outer surface of said outer joint part opposite said ball tracks while providing rotational freedom between said boot and said outer joint part, and wherein said second end is configured to selectively attach to a non-rotating portion of said drive unit when the inner joint part is connected to the drive unit.

2. The direct torque flow constant velocity joint connector according to claim 1 wherein said inner joint part includes an inner bore having a spline for indirect connection with a shaft of the drive unit.

3. The direct torque flow constant velocity joint connector according to claim 1 wherein said inner joint part includes an axial extension having a splined portion thereon for direct connection with a shaft of the drive unit.

4. The direct torque flow constant velocity joint connector according to claim 3 further including a circlip coupled to said axial extension for axial retention of the inner joint part when selectively attached to the drive unit.

5. The direct torque flow constant velocity joint connector according to claim 1 wherein said boot is a convoluted boot.

6. The direct torque flow constant velocity joint connector according to claim 1 further comprising a bearing assembly including an inner bearing race, an outer bearing race and a plurality of bearings rotationally coupling said inner bearing race to said outer bearing race, said outer bearing race coupled to a mounting lip of said first end of said boot and said inner bearing race coupled to said outer surface of said outer joint part.

7. The direct torque flow constant velocity joint connector according to claim 6 wherein said first end of said boot includes a lip seal.

8. The direct torque flow constant velocity joint connector according to claim 6 wherein said outer bearing race of said bearing assembly is integrally formed to said first end of said boot.

9. The direct torque flow constant velocity joint connector according to claim 6 wherein said bearing assembly is a needle bearing assembly.

10. The direct torque flow constant velocity joint connector according to claim 1 further including a securing member coupled to said second end of said boot, wherein said second end is compressibly securable to the drive unit by said securing member.

11. The direct torque flow constant velocity joint connector according to claim 10 wherein said securing member is a snap ring.

12. The direct torque flow constant velocity joint connector according to claim 10 wherein said securing member is a mounting flange and a plurality of bolts.

13. The direct torque flow constant velocity joint connector according to claim 10 wherein said securing member is integrally molded to said second end of said boot.

14. The direct torque flow constant velocity joint connector according to claim 1 wherein said boot is made from thermoplastic elastomer.

15. A direct torque flow connection comprising:
  a drive unit having a housing, whereby said drive unit is one of a differential, transmission and transfer case;
  a direct torque flow constant velocity joint connector having an inner joint part coupled in a rotationally fast way to said drive unit and an outer joint part; and
  a non-rotating boot sealingly connecting said housing of said drive unit to said direct torque flow constant velocity joint connector, wherein an end of said boot is secured to an outer surface of said outer joint part of said direct torque flow constant velocity joint connector and wherein said direct torque flow constant velocity joint connector may articulately rotate with respect to said housing of said drive unit.

16. The direct torque flow connection according to claim 15 wherein said boot is a convoluted boot having a first end and a second end, and further comprises a bearing assembly, said bearing assembly including an inner bearing race, an outer bearing race and a plurality of bearings rotationally coupling said inner bearing race to said outer bearing race, said outer bearing race coupled to said first end of said boot and said inner bearing race coupled to said outer joint part of said direct torque flow constant velocity joint connector, and said second end is connected to said housing of said drive unit, wherein said direct torque flow constant velocity joint connector may articulately rotate with respect to said boot.

17. The direct torque flow connection according to claim 16 wherein said first end of said boot includes a seal for sealingly engaging said direct torque flow constant velocity joint connector.

18. A direct torque flow constant velocity joint connector comprising:
  an outer joint part having an inner and outer surface and outer ball tracks located on said inner surface;
  an inner joint part having inner ball tracks and being configured to be directly connected to a drive unit to form a DTF connection, wherein said drive unit is one of a differential, transmission and transfer case;
  a cage;
  a plurality of balls provided in the cage and engaging the inner and outer ball tracks;
  a bearing assembly, said bearing assembly including an inner bearing race, an outer bearing race and a plurality of bearings rotationally coupling said inner bearing race to said outer bearing race, said inner bearing race coupled to said outer surface of said outer joint part; and
  a convoluted boot having at least one convolute, a first end and a second end, wherein said first end of said boot is coupled to said outer bearing race allowing said bearing assembly to be axially secured to said outer surface of said outer joint part while providing rotational freedom between said boot and said outer joint part, wherein said second end of said boot is selectively attachable to a drive unit when the inner joint part is selectively attached to a shaft of said drive unit.

* * * * *